United States Patent

Logan et al.

[15] 3,686,641

[45] Aug. 22, 1972

[54] MULTIPROGRAM DIGITAL PROCESSING SYSTEM WITH INTERPROGRAM COMMUNICATION

[72] Inventors: William A. Logan, Covina; Richard M. Holmes; William M. Denny, both of Sierra Madre; Michael J. Mahon, Pasadena, all of Calif.; Stephen Skalski, III, Westland; Gerald L. Henige, Royal Oak; Shreekant Bedekar, St. Clair Shores, all of Mich.

[73] Assignee: Burroughs Corporation, Detroit, Mich.

[22] Filed: Sept. 30, 1970

[21] Appl. No.: 76,964

[52] U.S. Cl. ....................................340/172.5

[51] Int. Cl. ....................................G06f 9/18

[58] Field of Search ..............................340/172.5

[56] References Cited

UNITED STATES PATENTS

| | | | |
|---|---|---|---|
| 3,546,677 | 12/1970 | Barton et al. | 340/172.5 |
| 3,400,376 | 9/1968 | McDonnell | 340/172.5 |
| 3,470,540 | 9/1969 | Levy | 340/172.5 |
| 3,553,651 | 1/1971 | Bird et al. | 340/172.5 |

*Primary Examiner*—Paul J. Henon
*Assistant Examiner*—M. B. Chapnick
*Attorney*—Christie, Parker & Hale

[57] ABSTRACT

A multiprogram computer system in which data is exchanged asynchronously between programs by transfer of data, on command of one program, to a queue in memory and, on command of another program, from the queue to the other program. The queue is double-ended so that data can be added or removed from either end of the queue to give programmatic control of priority. System integrity is maintained by providing a key word or name associated with each item in the queue. Any command to remove data from the queue searches for the item under a particular name.

7 Claims, 10 Drawing Figures

Patented Aug. 22, 1972 3,686,641

5 Sheets-Sheet 1

INVENTORS.
WILLIAM A. LOGAN
RICHARD M. HOLMES
WILLIAM M. DENNY
MICHAEL J. MAHON
STEPHEN SKALSKI, III
GERALD L. HENIGE
SHREEKANT BEDEKAR
BY Christie, Parker & Hale Patented Aug. 22, 1972 3,686,641

5 Sheets-Sheet 3

MULTIPROGRAM DIGITAL PROCESSING SYSTEM WITH INTERPROGRAM COMMUNICATION

FIELD OF THE INVENTION

This invention relates to digital data processing systems, and, more particularly, is concerned with a multiprogramming system having interprogram communication.

BACKGROUND OF THE INVENTION

The development of digital processing systems in which several programs are executed on some time-sharing basis of a digital processor is well known. One or more programs stored in memory are executed by providing execution of command in one program until some condition arises which interrupts the execution. The system may then switch to another program, such as master control program, until the interrupt condition is cleared or some other action again produces an interrupt condition.

It is sometimes desirable, such as in a complicated file situation for example, to have one program collect data and then pass the data along to another program to be further processed. Thus the transfer of data from one program to another becomes necessary. However, data cannot be inserted into a program until that program reaches the point where it is ready for the data. In the past, this has necessitated some arrangement for "synchronizing"d the two programs. This meant that the two programs had to be in memory at the same time and one or the other of the two programs had to be waiting for the other to execute the complimentary function, i.e., sending data or receiving data. Synchronization further means that only one message or set of data could be sent from one program to another at any time. The searching program had to wait for the receiving program to take the data before it could proceed.

SUMMARY OF THE INVENTION

The present invention avoids the above difficulties by establishing a queue in memory for receiving and accumulating data from sending programs. Data then can be removed selectively by receiving programs on demand. The queue is arranged to operate as a double-ended queue, that is, programs can add data to the queue at either end and programs can remove data from either end. Thus priority control is achieved by permitting communicating programs to utilize either a first-in first-out or a last-in first-out transfer. In addition, data groups are selectively withdrawn from the queue on an associative retrieval basis. Thus each sending program gives the data group a name. A receiving program scans the data groups, either starting with the first group or the last group in the queue, to locate a particular name.

In brief, this is accomplished by providing an arrangement in which any sending program having data available for another program initiates a routine in which the data is transferred to an available space in memory which is made part of a queue by linking the space by address information stored as part of the data to other data previously entered in the queue. The linkage is arranged such that the groups of data in the queue can be scanned in two directions and new data can be added to the queue by linking it to either end. Any program can remove data by scanning the linked data groups in the queue starting at either end, the scanning searching for data having an associated name or key. On identifying data having the desired associated name, the data may be transferred out of the queue by the receiving program. The linking information in the remaining data groups in the queue are then adjusted to remove the space from which the data is transferred from the queue.

DESCRIPTION OF THE DRAWINGS

A more complete understanding of the invention can be had by reference to the accompanying drawings wherein.

DETAILED DESCRIPTION

Figure 1:
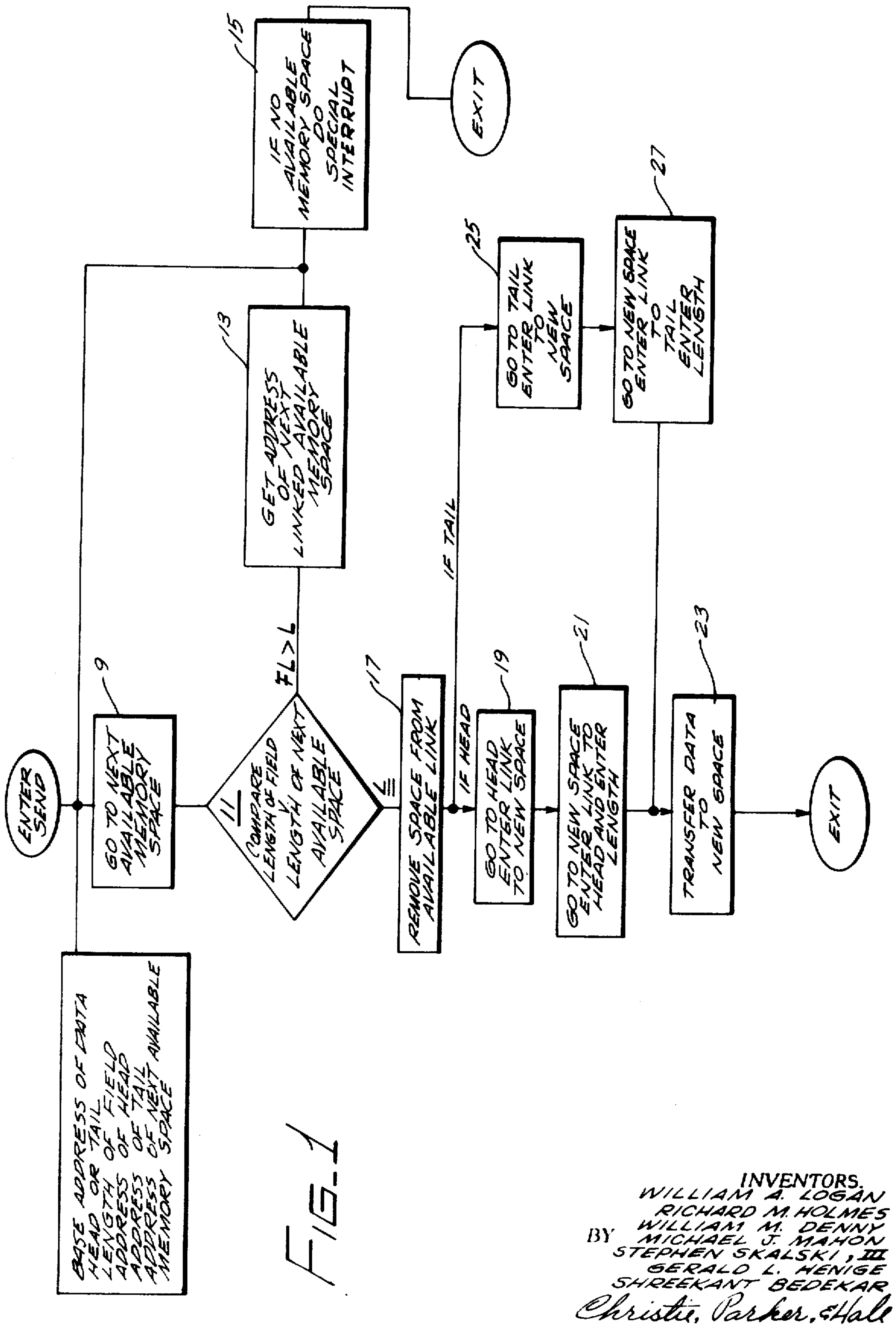
FIG. 1 is a flow diagram of a program sending operation.
Figures 2, 3, 4, 5, 6:
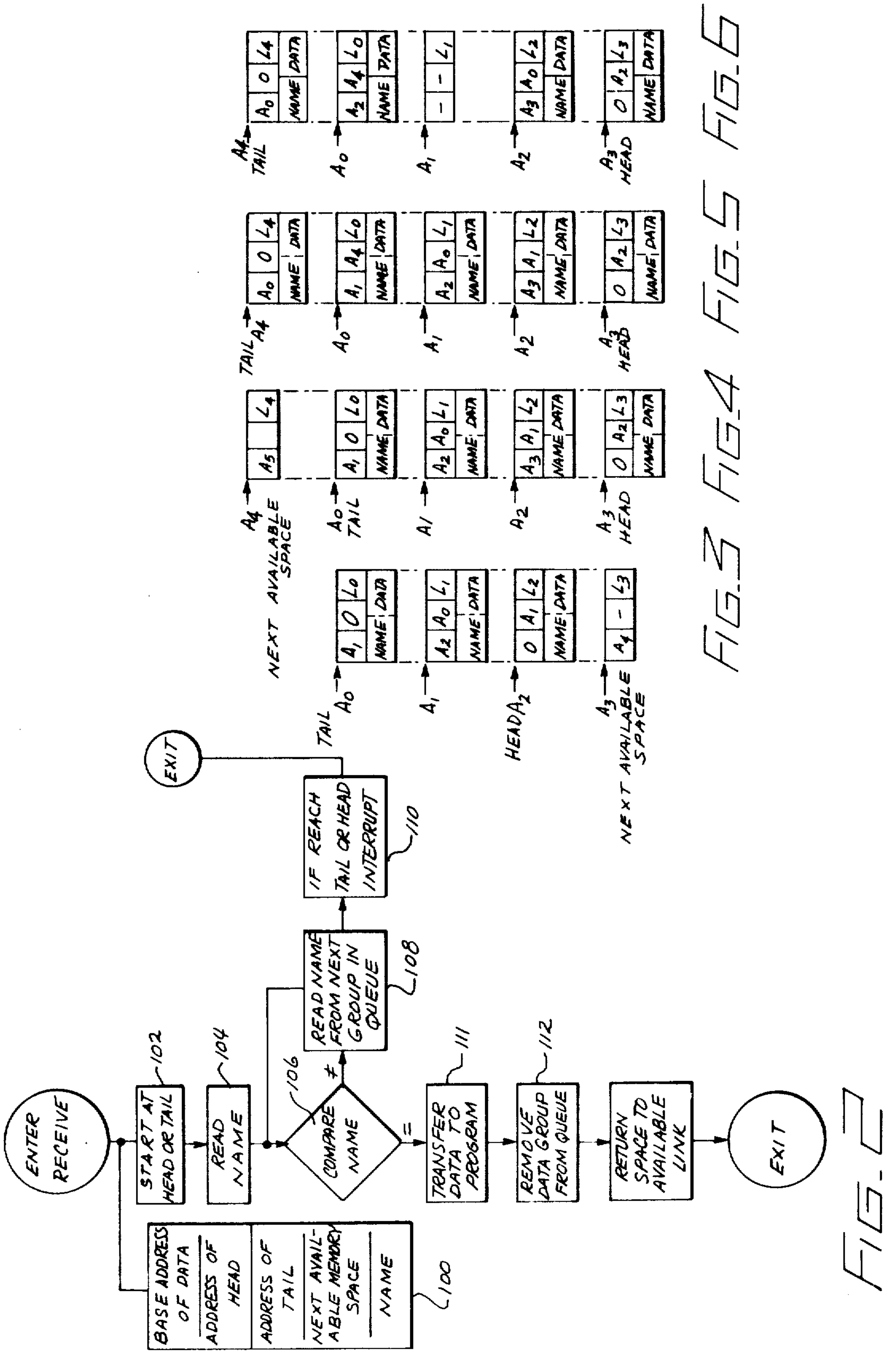
FIG. 2 is a flow diagram of a program receiving operation.
FIGS. 3–6 are diagrams showing the operation of the double-ended queue.
Figure 7:
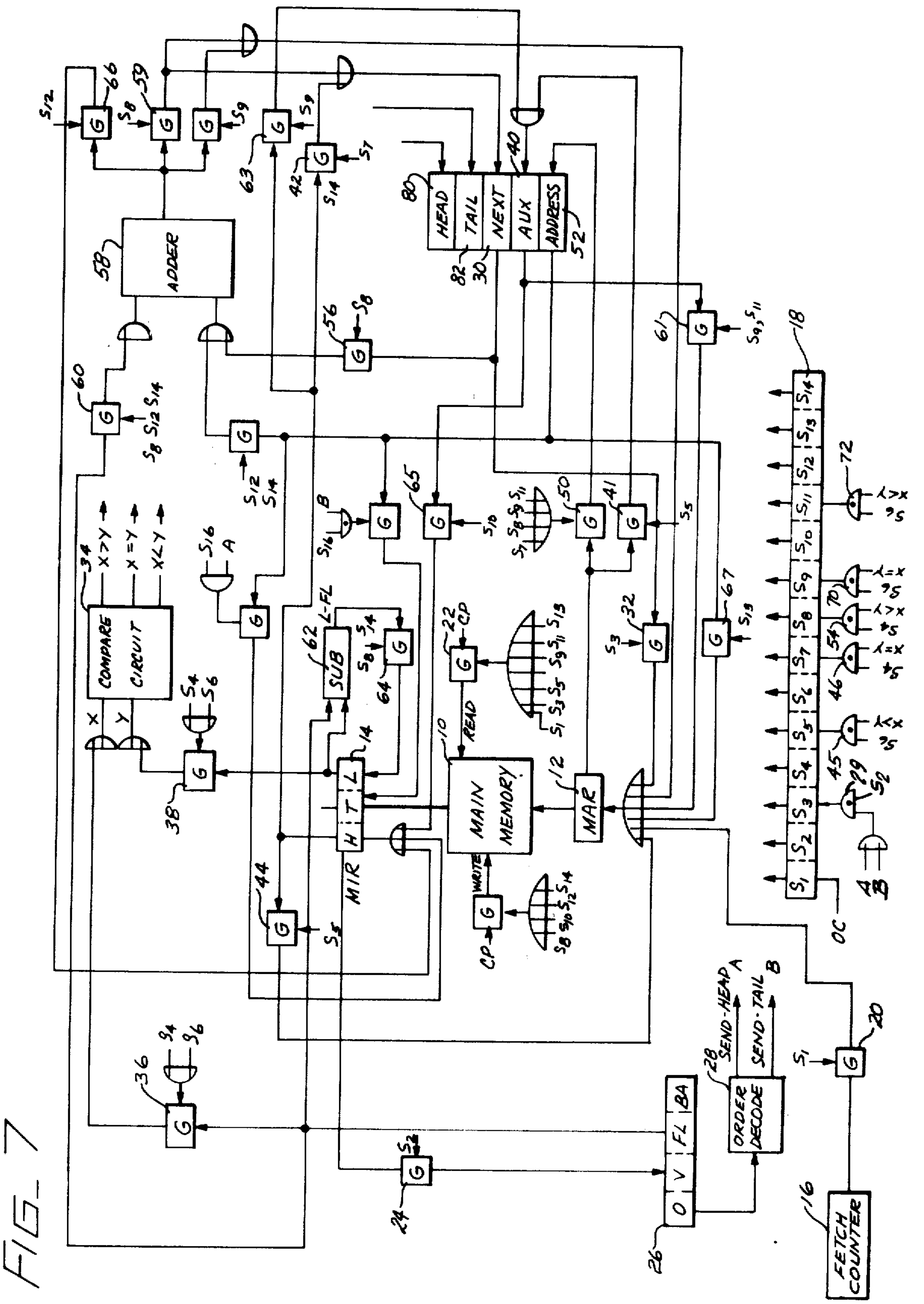
FIGS. 7–8 are schematic diagrams of one embodiment of the invention for transferring data from a program to the queue.

Referring to the drawings in detail, the overall operation of the invention is shown by the flow diagrams of FIGS. 1 and 2. Assume a program stored in a portion of main memory is being executed by a processor which fetches each instruction of the program from the main memory in sequence, entering each instruction into the processor and then executing the instruction by performing the operation called for, in a manner well know to the internally programmed computer art. At some point in the program it may be desired by the user to make data available to another program. This is accomplished, according to the present invention, by the procedure illustrated by the flow diagram of FIG. 1. FIG. 1 shows the procedure by which one program makes data available to other programs by transferring the data to a double-ended queue established in the main memory, while FIG. 2 shows the procedure by which a program receives data from the double-ended queue.

FIG. 3 illustrates diagrammatically the double-ended queue established in memory by the transfer of three groups of data. The TAIL end of the queue is at base address $A_0$ and the HEAD end of the queue is at base address $A_2$. Each entry includes links to other entries. Thus the entry at $A_1$ includes a link to $A_2$ and a link to $A_0$. The TAIL entry at $A_0$ has a link to $A_1$ but the other link is a zero since it is the TAIL of the chain. Similarly the HEAD entry has a zero link and a link to $A_1$, the zero indicating the entry is the HEAD of the chain. New entries, under control of the user, can be linked to either end of the queue. In addition to the two links, each entry in the queue includes the length of the data followed by the data. The first portion of the data is used as an identifying name, permitting reference to a group of data to be made associatively.

Referring to FIG. 1 in detail, on entering the procedure for sending data to the double-ended queue, the program provides information as to the base address and length of field of the data in the program which is to be transferred to the queue. It also indicates whether the data is to be inserted in the HEAD or the TAIL of the double-ended queue. Normally all unused space in memory is linked together, each group of contiguous memory cells having associated therewith an initial word having information as to the number of cells, i.e., the length of the memory space, and a pointer to the base address of the next available memory space. The first step in the procedure, as indicated at 9, is to find an available space in memory which is large enough to receive the data. A register points to the base address of the first group of available contiguous memory cells. By starting with the first available space and going to each successive group of available memory spaces by means of the pointers, and by examining the length of each space, it is possible to find a group of memory cells which is equal to or greater than the number of cells required to receive the data. This process is indicated at 11 and 13 of FIG. 1. If no available memory space is found which is large enough to receive the data, the operation terminates in a special interrupt 15 which alerts the system that the routine cannot be carried out.

If a space which is equal to or larger than the required field length is discovered, then that space is removed from the chain linkage of the available memory space, as indicated at 17. This is done by changing the pointer in the prior group in the chain to point to the subsequent group of the chain.

A space is now available for receiving the data from the program, but first this space must be linked to either the HEAD or the TAIL of the existing double-ended queue, if the queue has already received data. If it is desired to add this data to the HEAD of the queue, the routine goes to the location in memory which forms the present HEAD of the double-ended queue and enters a link address to the new space, as indicated at 19. The routine then goes to the new space and enters an address linking it to the present HEAD of the queue. Thus the new space becomes the new HEAD of the queue and is linked back to the prior data and the prior data is linked to the new space. The data is then transferred from the specified location within the program to the new space added to the HEAD of the double-ended queue, as indicated at 23.

FIG. 4 shows the condition of the queue after a new group of data is added to the HEAD. The available space is at $A_3$. This address is inserted as a link address at the prior HEAD at $A_2$. The new HEAD then is linked to the prior HEAD by inserting the link address $A_2$ and a zero is inserted to indicate it is the HEAD of the queue.

Alternatively, if the program specifies that the new data is to be added to the TAIL of the double-ended queue, the routine goes to the location of the data forming the present TAIL of the queue and enters a link to the new space, as indicated at 25. The program then goes to the new space and enters a linking address to the data located at the TAIL of the queue, as indicated at 27. Thus the new space forms the new TAIL of the queue and is linked in both directions within the queue. Transfer of data to the new space is then completed.

FIG. 5 shows the condition of the queue after a new group of data is added to the TAIL. The available space is at $A_4$. This address is inserted as a link address at the prior TAIL at $A_0$. The new TAIL then is linked to the prior TAIL by inserting the link address $A_0$ and a zero is inserted to indicate it is the TAIL of the queue.

One embodiment of apparatus for carrying out the routine described above in connection with FIG. 1, is shown in FIGS. 7 - 10. A main memory 10 is a conventional core memory in which words can be stored and read out from any address specified by a MAR register indicated at 12, the word being transferred between main memory and an Information register MIR 14. A fetch counter 16 is used to address instructions of a program stored in main memory in sequential address locations. A sequence counter 18 controls the sequence of operations within the processor by which an instruction is first fetched from memory and then executed. The sequence counter 18 advances through a plurality of states in synchronism with clock pulses applied at CP. In addition, the sequence counter can be set to any state in synchronism with a clock pulse by an input signal applied to a corresponding stage of the counter. Sequence counters of this type are conventional in the central control systems of data processors.

Initially the sequence counter is set to $S_1$ to initiate the fetch operation. During $S_1$, the contents of the fetch counter 16 are gated by a gate 20 to the ADDRESS register 12 of the main memory. A clock pulse is then gated to the READ input to the main memory through a gate 22 causing the instruction to be read out into the Information register 14. With the sequence counter advanced to $S_2$ by the same clock pulse, the instruction is then gated from the Information register 14 through a gate 24 to an Instruction register 26. This completes the fetch operation except that the fetch counter 16 is also caused to count up one during the $S_2$ state so as to point to the next instruction of the program stored in main memory.

The instruction stored in the Instruction register includes an order section 0 which designates the particular instruction to be carried out. This section is applied to an Order decoder 28. The present invention is concerned with four possible orders, namely: A, an order to send data to the HEAD of the queue; B, send data to the TAIL of the queue; C, receive data from the HEAD of the queue; and D, receive data from the TAIL of the queue.

In addition, the instruction includes a base address BA which specifies the location within the program where data is to be received or from which data is to be sent to another program. The instruction also includes a field length portion FL which specifies the number of data words to be transferred. The instruction also includes a group of variant bits V which can be used for various control purposes, such as identifying the code name of data in the queue to be transferred to the program during a Receive operation.

Assuming the order provides for a Send to either the HEAD or the TAIL of the queue, as provided by the flow diagram of FIG. 1, the sequence counter is set to the $S_3$ state by the A or B output lines from the decoder 28 by the output of an AND circuit 29. During the $S_3$ state and subsequent states of the sequence counter, a search is made of the available memory spaces to locate a space of sufficient length to receive the data. When a suitable space is found, it is removed from the available memory linkage and then linked into the double-ended queue. The address of the next available memory space is stored in a register (NEXT) 30 which points to the base address of the first space in the link chain of available spaces. During the $S_3$ state, this address is transferred by a gate 32 to the memory address register (MAR) 12 and a Read operation is executed by applying the $S_3$ state to the gate 22. As a result the first word of the first available memory space is placed in the Information register 14. This is a control word which specifies the length of the available space in a portion of the word designated L and includes a link address or pointer, in a portion of the word designated H, pointing to the next available memory space in the chain.

The next clock pulse advances the sequence counter to the $S_4$ state in which a comparison is made between the required field length FL specified by the instruction in the Instruction register 26 with the length of the available memory space which is read out from the MIR register 14. This is accomplished by a Compare circuit 34 to which the field length data FL is coupled by a gate 36 and the length of the memory space is coupled by a gate 38. The Compare circuit provides three outputs indicating whether the field length is less than $(X<Y)$, equal to $(X=Y)$, or greater than $(X>Y)$ the available space. If the field length is greater, indicating that the available memory space is not large enough, the sequence counter 18 advances to the $S_5$ state and the next available memory space is examined. This is accomplished by putting the link address in the H portion of the MIR register 14 into the MAR register 12 through a gate 44 and doing a Read operation. This places the control word from the next available memory space into the MIR register 14. Also, in order to retain the address of the prior space in the chain, the contents of MAR 12 are transferred to an auxiliary register (AUX) 40 by a gate 41.

The sequence counter then advances to the $S_6$ state in which a comparison is again made by the Compare circuit 34 to determine if this memory space is sufficiently large to receive the data. If it is not, the sequence counter is reset to the $S_5$ state by the output of an AND circuit 45 until a memory space is found which is large enough to receive the data.

If the first available memory space is equal to the required data space, the sequence counter is set from the $S_4$ state directly to the $S_7$ state by the output of an AND circuit 46. During the $S_7$ state, the link address at H in the MIR register 14 is set into the NEXT register 30 by a gate 42 to provide a pointer to the next available memory space. At the same time the contents of the MAR register 12 are transferred by a gate 50 to an ADDRESS register 52 which stores the base address of the new space to be added to the queue. The sequence counter is then set by the next clock pulse to the $S_{15}$ state by the $S_7$ state, initiating the operation by which the new space is added to the queue.

If at the end of the $S_4$ state, the Compare circuit 34 indicates that the length of the available memory space L is greater than the required field length FL, the sequence counter is set to the $S_8$ state by the output of an AND circuit 54. To the extent the available space is in excess of the needed space, the extra space must be linked into the chain of available spaces in memory. During the $S_8$ state, the address in the MAR register 12 is transferred by gate 50 to the register 52. The base address in the NEXT register 30 is applied through a gate 56 to one input of an ADDER circuit 58. At the same time the field length FL is coupled from the Instruction register 26 through a gate 60 to a second input of the ADDER circuit 58. The resulting address points to the base of the memory space which will remain after the required space is added to the queue. It is necessary to link this remaining space into the available space linkage. To this end, the output of ADDER circuit 58 is coupled by a gate 59 to the MAR register 12 and also stored in the NEXT register 30 to provide a new pointer to the first available memory space. The length information L in the information register 14 is reduced by the amount of the field length by means of a subtracting circuit 62, the output of which is coupled by a gate 64 back into the Information register 14. The clock pulse at the end of the $S_8$ state causes a WRITE operation, thereby inserting a new control word into the first available memory space to which the NEXT register 30 now points. Again the sequence counter is set to the $S_{15}$ state.

If the first available memory space L is less than the required field length FL, and the sequence counter has cycled through the $S_5$ and $S_6$ states until an available memory space is found which is sufficiently long, the sequence counter is set to the $S_9$ state or the $S_{11}$ state, depending upon whether the new space L is equal to or greater than the required field length FL. Assuming that the space is equal to the required field length, the link in the prior available space must be changed to the link address in the control word of the space being removed from the chain. The sequence counter is set to the $S_9$ state by the output of an AND circuit 70. During the $S_9$ state, the address in the MAR register 12 again is stored in register 52 through the gate 50. The base address of the previous memory space, stored in the auxiliary register 40, is transferred to the MAR register 12 by a gate 61, and the link address at H in MIR register 14 is coupled by a gate 63 to AUX register 40. This is followed by a READ operation with the next clock pulse which puts the prior control word into the MIR register 14. The new link address is then transferred during the $S_{10}$ state by a gate 65 into the H portion of the MIR register 14. The next clock pulse causes a memory WRITE operation and the sequence counter 18 is set to $S_{15}$.

Finally, if an available memory space has been found at the end of the $S_6$ state which is larger than the required field length, the sequence counter 18 is set to the $S_{11}$ state by the output of an AND circuit 72. Again the contents of the memory ADDRESS register 12 are stored in the register 52 by the gate 50 to preserve the base address of the space to be added to the queue. The contents of the AUX register 40 are transferred to the memory register 12 to address the prior available memory space and a READ operation is completed. With the sequence counter advancing to the $S_{12}$ state, the contents of the ADDRESS register 52 are added to the field length FL by the ADDER 58 to get the address of the next available memory space. The output of the ADDER is transferred by a gate 66 to the H portion of the control word in the Information register 14 and a WRITE operation is performed by the next clock pulse to provide a new link word in the prior available memory space.

With the sequence counter advancing to the $S_{13}$ state, the base address in the ADDRESS register 52 is transferred to the memory ADDRESS register 12 by a gate 67 and a READ operation takes place. This place the control word in the new memory space for the queue into the MIR register 14. During the $S_{14}$ state, a new link address of the word in the Information register 14 is modified by subtracting the field length. This is accomplished by the subtractor circuit 62, the output of which is placed back in the Information register 14 by the gate 64. Thus a new control word is formed which is restored into main memory during the $S_{14}$ state by adding the field length to the base address in the register 52 through the ADDER 58 and applying the output of the ADDER 58 to the MAR register 12. A WRITE operation then stores the new link word in the next available memory space in the chain.

Figure 8:
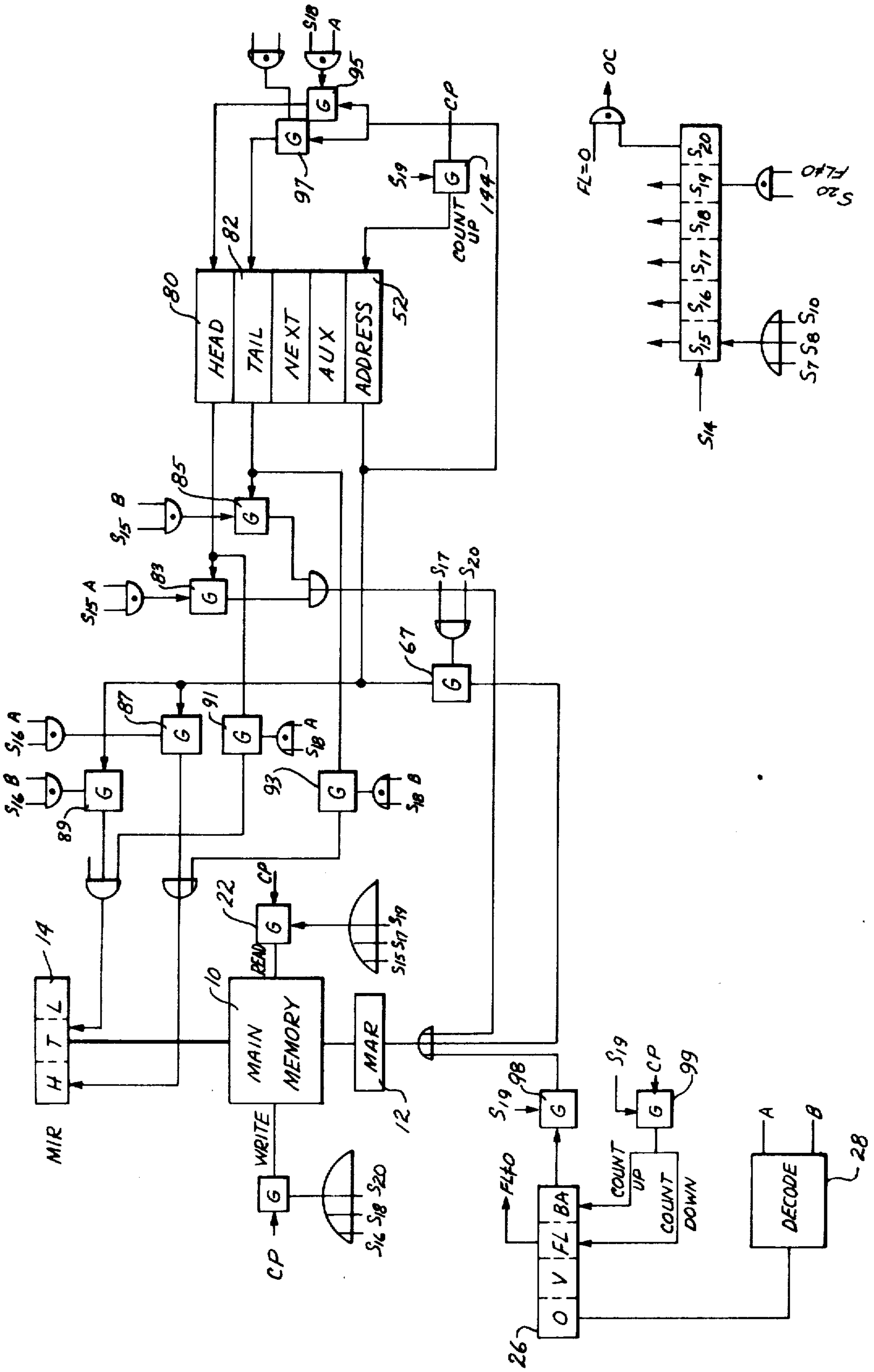

With the sequence counter in the $S_{15}$ state, an exact amount of memory space has been set aside, with a base address pointer in the ADDRESS register 52, which may receive data from the program. As shown by the flow diagram of FIG. 1, it is now necessary to add this space to either the HEAD or the TAIL of the existing double-ended queue. FIG. 8 shows the operation of the processor logic starting with the $S_{15}$ state. Two registers 80 and 82, labeled HEAD and TAIL, store addresses pointing respectively to the HEAD and TAIL of the double-ended queue in memory. If no data has yet been placed in the queue, of course, both of these registers will be cleared. If only one group of data has been placed in the queue, both of these registers will point to the same base address. Assuming for the moment that several groups of data have been placed in the queue and the registers 80 and 82 point to two different groups of data, the operation of the processor is as follows:

With the sequence counter now in the $S_{15}$ state, depending upon whether the order calls for the new data to be added to the HEAD of the queue, as indicated by a signal on line A. from the decoder 28, or to be added to the TAIL end of the queue, as indicated by the line B from the decoder 28, the address from either the HEAD register 80 or the TAIL register 82 is transferred to the MAR register 12 through gates 83 or 85 followed by a READ operation. This puts the control word for the data at the HEAD or TAIL into the MIR register 14 containing two link addresses and the length of the space. If the group is from the HEAD of the queue, the H field contains a zero. See FIG. 2. If the group is from the TAIL of the queue, the T field contains a zero. During the $S_{16}$ state, the address in the register 52 is placed into the appropriate field in the MIR register 14 by either a gate 87 or gate 89 to replace the zero and a WRITE operation takes place. Thus, as shown in FIGS. 3, 4 and 5, the zero in the prior HEAD or TAIL of the queue is replaced by a linking address to the new memory space being added to the queue.

A new control word for the memory space being added must now be loaded in the MIR register 14. First, during the $S_{17}$ state, the control word for the space is placed in the MIR register 14 by putting the address in the MAR register 12 through gate 67 from ADDRESS register 52 and doing a READ operation. If the space is being added to the HEAD of the queue, the address in register 80 is transferred to the T field in the MIR register 14. If the space is being added to the TAIL of the queue, the address in register 82 is transferred to the H field. This is accomplished by gates 91 and 93, respectively, during the $S_{18}$ state. The other link address is set to zero. A memory WRITE operation is then initiated. Thus a new control word is loaded into the newly added memory space which links it with either the HEAD or the TAIL of the queue and establishes the new space as the new HEAD or the TAIL of the queue. At the same time, the base address in the register 12 is transferred to either the register 80 or 82 through gates 95 and 97, respectively, to provide a new pointer to the HEAD or TAIL of the queue, as the case may be.

During the $S_{19}$ state of the sequence counter 18, the base address in the Instruction register 26 is transferred to the MAR register 12 by a gate 98 and a READ operation takes place. At the same time the base address is incremented by one and the field length is decremented by one in the Instruction register 26 by a clock pulse passed by a gate 99. The base address in the register 52 is also incremented by one. During the $S_{20}$ state, the contents of the register 52 are transferred to the MAR register 12 and a memory WRITE operation is instituted which stores the first word of data into the new space added to the queue. The $S_{19}$ and $S_{20}$ states are repeated until the field length FL is reduced to zero, indicating that all the data has been transferred from the program memory to the queue. This completes the execution of the Send instruction and an OC signal is produced to initiate a fetch of the next instruction.

When a program wants to receive data from another program it provides a Receive instruction in which the order specifies whether the data is to be received from a named group, starting with the HEAD of the queue or the TAIL of the queue, as indicated respectively by the C and D output lines of the decoder 28. The instruction in the register 26 provides the base address BA where the data is to be transferred into the program and the identifying name of the data group which is stored as the variant bits V of the instruction. In addition, the address of the next available memory space is stored in the register 30, the address of the HEAD of the queue is stored in register 80, and the TAIL address of the queue is stored in the register 82. Thus all the information indicated at 100 in the flow diagram of FIG. 2 is provided at the start of the execution of a Receive operation.

Continuing with the flow diagram of FIG. 2, after entering the Receive operation, starting at either the HEAD or the TAIL of the queue as indicated at 102 depending on the specific instruction, the name is read out and compared with the V field of the instruction, as indicated at 104 and 106. If the name is not the same as the name specified by the variant field of the instruction, the name associated with the next group of data in the queue, going from either the HEAD or the TAIL, is read out, as indicated at 108, and the comparison is repeated. This is continued until either a group of data is found having the right name or the entire queue is scanned, either from the TAIL to the HEAD or from the HEAD to the TAIL, depending upon the instruction. In the latter event, an Interrupt condition is established, as indicated at 110 in FIG. 2, which signals the program that the instruction cannot be executed because no data is present in the queue having that name.

Assuming that a group of data is found having the right name, the data is transferred from the queue to the portion of memory associated with the program and having the base address specified by the BA field in the instruction, as indicated at 111 in FIG. 2. Once the data is transferred to the program, the links in the queue must be rearranged so as to eliminate the group of data which has been transferred out of the queue, as indicated at 112. This process may be better understood by reference to FIGS. 5 and 6, FIG. 5 representing the condition of the queue at the time a Receive operation is initiated, and FIG. 6 representing the condition of the queue after a group of data has been read out of the queue starting with base address $A_1$. It will be noted that this is accomplished in FIG. 6 by changing the linking address at location $A_0$ to point ahead to location $A_2$ instead of $A_1$. Likewise the link address at $A_2$ is changed to point back to $A_0$ instead of $A_1$. Thus locations $A_0$ and $A_2$ are linked together in both directions and location $A_1$ is eliminated from the queue.

Figures 9, 10:
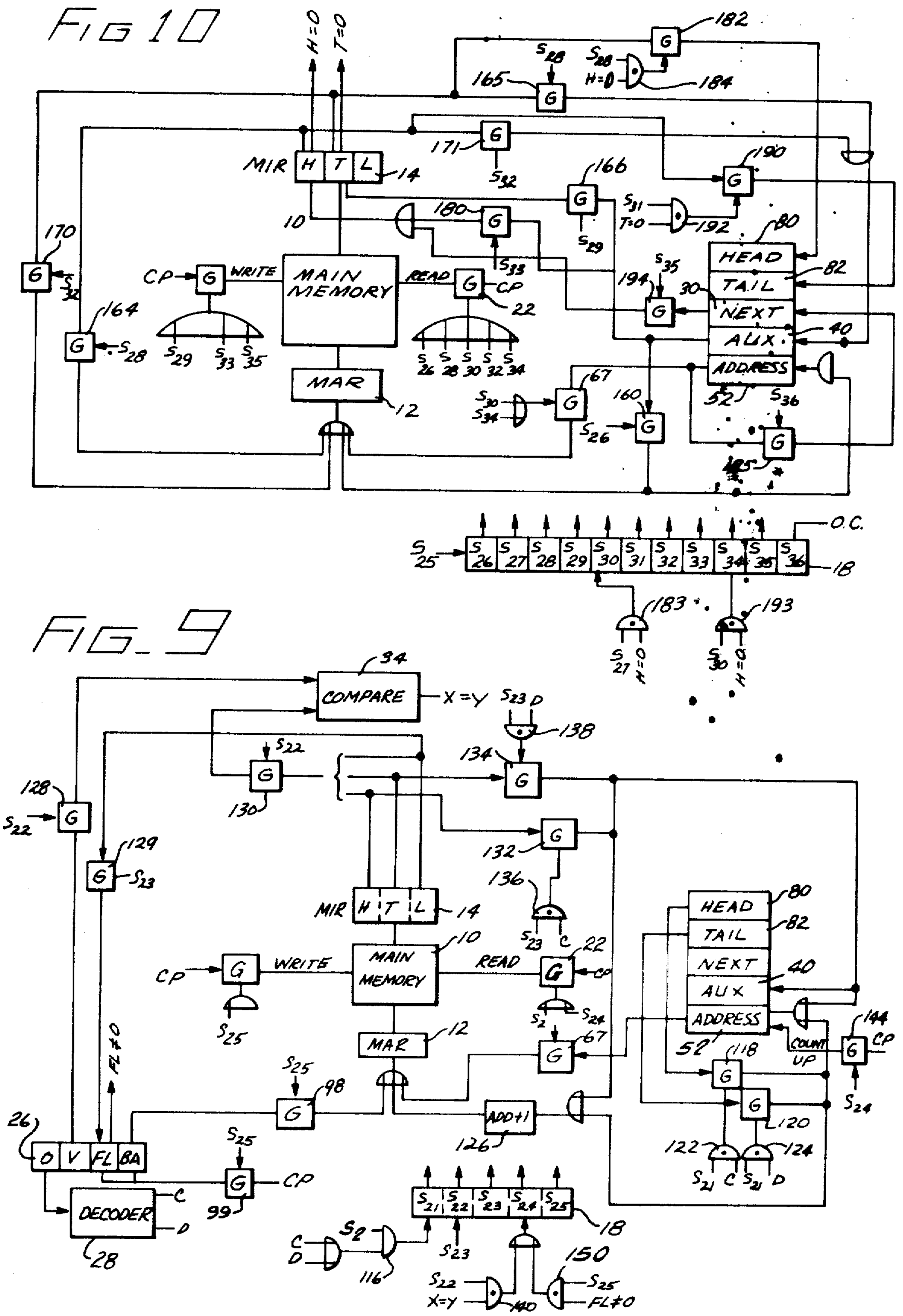
FIGS. 9–10 are schematic diagrams of one embodiment of the invention for transferring data from the queue to a program.

Execution of the Receive instruction is shown in detail in connection with FIGS. 9 and 10. Component parts of the processor of FIGS. 7, 8, 9 and 10 which are the same, carry the same reference numeral in all figures.

As shown in FIG. 9 after the fetch operation has placed a Receive instruction in the Instruction register 26, either the C line or the D line from the decoder 28 is activated depending upon whether the operation is to start at the HEAD or the TAIL of the queue. In either case, the sequence counter 18 is set to the $S_{21}$ state by the output of an AND circuit 116 at the end of the fetch operation. During the $S_{21}$ state, either the base address at the HEAD of the queue in register 80 or the base address of the TAIL of the queue in register 82 are stored in the ADDRESS register 52 through gates 118 or 120. The gate 118 is operated by an AND circuit 122 which senses the $S_{21}$ state and the output C from the decoder 28. The gate 120 is operated by an AND circuit 124 which senses the $S_{21}$ state and the D line from the decoder 28. The same address is incremented by one by an ADD + 1 circuit 126 and applied to the MAR register 12. This address points to the second word in the group forming the HEAD or the TAIL of the queue, which second word is the identifying name of the data. A READ cycle is initiated by the clock pulse at the end of the $S_{21}$ state, placing the name information in the MIR register 14.

With the sequence counter advanced to the $S_{22}$ state by the next clock pulse, a comparison is made by the Compare circuit 34 between the name stored in the V field of the Instruction register 26, coupled through a gate 128, and the name stored in the MIR register 14, coupled through a gate 130. If the two are unequal, the sequence counter 18 then advances to the $S_{23}$ state.

During the $S_{23}$ state, the linking address in the H field of the control word in the MIR register 14 or the linking address in the T field of the control word are transferred to the MAR register 12 through the ADD + 1 circuit 126. This is accomplished, respectively, by a gate 132 operated by an AND circuit 136 which senses the C level from the decoder 28 and by a gate 134 operated by an AND circuit 138 which senses the D level from the decoder 28. At the same time, the linking address is stored in the ADDRESS register 52 and the AUX register 40. Also the length of the data group in the L field of the control word in the MIR register 14 is transferred by a gate 129 to the FL field of the Instruction register 26. The sequence counter is then reset to the $S_{22}$ state and the above comparison operation is repeated. Once an Equal (X=Y) comparison is achieved, the sequence counter 18 is set to the $S_{24}$ state by the output of an AND circuit 140 which senses the X=Y condition from the Compare circuit 34 and the fact that the sequence counter is in the $S_{22}$ state.

Since a group of data has now been identified and the base address is stored in the AUX register 40 and the ADDRESS register 52, it is now necessary to transfer the group of data to the location specified by the BA field in the Instruction register 26. This is accomplished, starting with the $S_{24}$ state, by transferring the address in the ADDRESS register 52 by the gate 67 to the MAR register 12 and doing a READ operation, thus placing the first word in the data group into the MIR register 14. The next clock pulse CP also increments the address in the ADDRESS register 52 through a gate 144 so as to point to the next word in the group of data stored in the queue.

Next, during the $S_{25}$ state of the sequence counter 18, the base address in the BA field of the Instruction register 26 is transferred to the MAR register 12 through a gate 98 and a memory WRITE operation is initiated, causing the word in the MIR register 14 to be stored in the base address location specified by the program. At the same time the base address is counted up one by the next clock pulse passed by the gate 99. The same clock pulse counts down the field length FL in the Instruction register 26 by one.

If the field length has not been counted down to zero, the sequence counter is reset to the $S_{24}$ state by the output of an AND circuit 150 which senses that the sequence counter is in the $S_{25}$ state and FL $\neq$ 0. Thus the above sequence of operations is continued repeatedly until the FL field is counted down to zero, indicating that the transfer of data has been completed. The sequence counter then advances to the $S_{26}$ state.

It is now necessary for the queue to be adjusted in the manner described above in connection with FIGS. 5 and 6. FIG. 10 shows the processor logic for the sequence counter starting with $S_{26}$. Initially, during the $S_{26}$ state, the base address of the group of data removed from the queue, which was stored originally in the AUX register 40, is transferred by a gate 160 to the ADDRESS register 52 and also to the MAR register 12, followed by a memory READ operation. As a result, the control word associated with the space from which data was transferred is read out of memory into the MIR register 14 and the sequence counter advances to the $S_{27}$ state. At this point a check is made to determine whether the link address in the H field of the control word is or is not a zero. If it is not a zero, indicating that the group of data is not at the HEAD of the queue, the sequence counter automatically advances from the $S_{27}$ state to the $S_{28}$ state.

During the $S_{28}$ state, the H field of the control word in the MIR register 14 is transferred by a gate 164 to the MAR register 12 and a READ operation is instituted placing the control word of the next group of data into the MIR register 14. At the same time, the link address in the T field of the MIR register 14 is transferred by a gate 165 to the AUX register 40.

With the sequence counter advancing to the $S_{29}$ state, and the new control word in the MIR register 14, the contents of the AUX register 40 are transferred by a gate 166 back into the T field of the MIR register 14, and a WRITE operation is initiated. This changes the linkage address linking back to the TAIL of the queue. The sequence counter then advances to the $S_{30}$ state in which the base address of the group of data being removed from the queue is again transferred by the gate 67 to the MAR register 12 and a READ operation is initiated.

During the $S_{31}$ state, the T field of the control word is checked to determine whether it is zero or not. If it is not a zero, the sequence counter advances to the $S_{32}$ state. At this time the T field is transferred by a gate 170 to the MAR register 12 and a READ operation is initiated. At the same time the H field is transferred by a gate 171 to the AUX register 40.

During the $S_{33}$ state, the contents of the AUX register 40 are transferred back into the H field of the control word in the MIR register 14 through a gate 180 and a memory WRITE operation is initiated. The sequence counter then advances to the $S_{34}$ state. Thus a new linkage is provided in the control word of the group of the data remaining in the queue, in the manner indicated in FIG. 6.

It should be noted that if the H field is a zero during the $S_{27}$ state of the sequence counter 18, the link address in the T field of MIR register 14 points to the new HEAD of the queue. A gate 182 transfers the T field of the MIR register 14 to the HEAD register 80 in response to the output of an AND circuit 184 which senses the $S_{28}$ state and the H = 0 output of the H field of the MIR register 14. At the same time the sequence counter is set directly to the $S_{30}$ state by the output of AND circuit 183.

Similarly at the $S_{31}$ state, if the T field of the MIR register 14 is a zero, the link address in the H field points to the new TAIL of the queue. A gate 190, in response to an AND circuit 192 which senses that the $S_{31}$ state and the T = 0 condition, couples the new address into the TAIL register 82. In this case the sequence counter is advanced directly to the $S_{34}$ state by the output of AND circuit 193.

The only operation remaining is to return the space from which the data has been transferred back into the chain of available memory spaces. To this end, during the $S_{34}$ state, the base address stored in the ADDRESS register 52 is again transferred by the gate 67 to the MAR register 12 and a READ operation is instituted, again placing the control word in the MIR register 14. The address in the NEXT register 30, which points to the first available space in the chain, is then transferred to the H field of the MIR register 14 during the $S_{35}$ state by means of a gate 194 and a WRITE operation is completed. Thus a pointer is inserted in the space which points to the next available space in the chain.

When the sequence counter advanced to the $S_{36}$ state, the address stored in the ADDRESS register 52 is placed in the register 30 by a gate 195, thereby providing a pointer to the space added to the available list. This completes the Receive operation.

From the above description it will be recognized that the present invention provides an arrangement by which data can be readily transferred between one program and another on a nonsynchronous basis. The arrangement has the advantage that messages or groups of data can be introduced into either end of a queue, so that the user program can control the priority in which elements of data are positioned in the queue. The receiving program then may request a named element starting with either end of the queue to be returned to it for further processing.

It will be understood that while the invention has been described in a processor having hard-wired logic for executing a specific instruction carrying out the specific sequence of steps, the same steps could be carried out by a master control program which could be initiated by an interrupt from any of the user programs whenever it is desired to send data to or receive data from the queue.

What is claimed is:

1. In a multiprogram computer system in which a group of programs are stored in memory, with the commands of one program at a time being executed by a processor, the method comprising the steps of:

on command of any program being executed by the processor, locating an available space in memory, loading said space in memory with a first set of data from a predetermined storage location allocated to the program being executed, storing a first linking address with the first set of data, the first linking address pointing to the base address location of another space in memory storing a second set of data, inserting a second linking address with said second set of data pointing to the base address of the newly stored first set of data, whereby each set of data loaded in memory is linked to a previously loaded set of data and to a subsequently loaded set of data, and storing the base address of the newly loaded space in a location available to all programs executed by the processor.

2. The method of claim 1 further comprising the steps of: on command of a program being executed by the processor, scanning the linked data sets in sequence using the linking addresses stored with each data set; reading out a predetermined portion of each data set; comparing the portion read out with a key word; and on finding a valid comparison, transferring the entire associated set of data to a location in memory identified by the stored program being executed.

3. In a digital processing system having multiprogramming in which a plurality of programs may be stored in memory and executed on a time-shared basis by a processor, the method of transferring data from one program to another, comprising the steps of:

on command of a first program, transferring a first group of data stored as part of the program in memory to a new location in memory starting at a base address of an available space in memory; storing the base address of said new location in a predetermined storage location; storing with said first group of data at the new location the base address of a second group of data stored in memory; on command from a second program, reading out a selected portion of the first data group at the base address in said predetermined storage location; comparing said selected portion with predetermined coded bits to test for equality; in the absence of equality, reading out the same selected portion of the second data group as specified by the base address stored with the first data group; and, on determining an equality condition, transferring the associated data group to a location in the memory specified by the second program.

4. The method of claim 3 further including the steps of: on determining an equality condition, transferring the data group to a location in the main memory specified by the second program.

5. The method of claim 3 further including the step of: changing the base address pointing to the group of data transferred to the second program to the base address stored with said group of transferred data.

6. Apparatus for storing items in memory comprising:

an addressable memory having a plurality of items stored in various locations in memory, each item having two link addresses to two other items and each link address of an item pointing to another item having a link address pointing back to the same item; means storing first and second addresses pointing respectively to two of the items; means storing the address of a memory location for a new item; and means for linking the new item location to either of the two items indicated by said means storing first and second addresses, said means linking the new item location including means for storing a selected one of said first and second addresses as a link address in the new item in memory and means replacing said selected address in said storing means with the address of the new item location.

7. Apparatus of claim 6 further including means responsive to said means storing first and second addresses for reading out a portion of an item including the link addresses selectively from one of said first and second address locations in memory, means comparing the portion read out with a predetermined condition identifying a particular item, means responsive to the comparing means when the portion read out is not equal to said predetermined condition for reading out a portion of an item from one of the link address locations associated with the prior item read out, and means responsive to the comparing means when the portion read out is equal to said predetermined condition for transferring each of the two addresses associated with the item portion read out to the respective items identified by the other of the two link addresses.

* * * * *